Patented Apr. 2, 1940

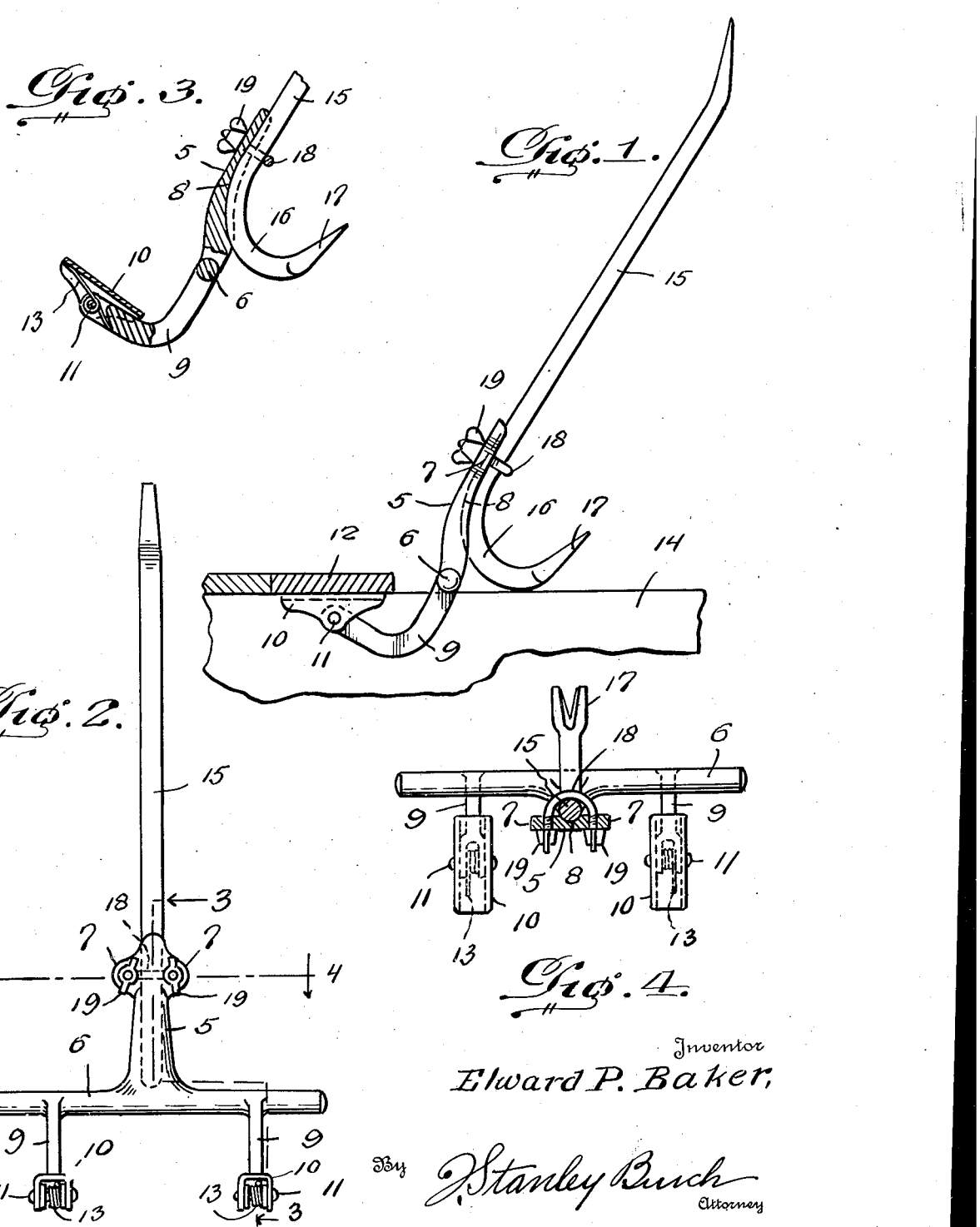

2,195,667

UNITED STATES PATENT OFFICE 2,195,667

CARPENTER'S WRECKING TOOL

Elward P. Baker, Henderson, Tex.

Application March 13, 1939, Serial No. 261,637

3 Claims. (Cl. 254—131)

This invention relates to an improved wrecking tool adapted to be used by carpenters in razing buildings and analogous work wherein it is desirable to separate pieces of lumber without splitting or otherwise injuring the same, so that the lumber may be used again.

An object of the present invention is to provide a tool of the above kind which is extremely simple in construction and efficient in use, and which have pivoted shoes normally yieldingly positioned for proper engagement with the boards to be pried loose.

Another important object of the present invention is to provide a tool of the above kind including a detachable handle member similar to an ordinary "pinch bar" which has a curved end terminating in a claw for use in extracting nails.

Other objects and advantages of the present invention will become apparent from the following description when considered in connection with the accompanying drawing in which:

Figure 1 is a side elevation of the present tool in use for taking up flooring.

Figure 2 is a front elevational view thereof.

Figure 3 is a fragmentary section on line 3—3 of Figure 2; and

Figure 4 is a horizontal section on line 4—4 of Figure 2.

Referring in detail to the drawing, the present tool consists of a broad-engaging element or unit consisting of a short shank 5 having a cross bar 6 integral with one end thereof and provided near its other end with laterally projecting ears 7. The shank 5 is further provided in the rear side thereof with a longitudinal groove 8 for a purpose which will presently become apparent, and projecting downwardly and forwardly from the opposite end portions of the cross bar 6 are curved arms 9 having shoes 10 pivoted to the free forward ends thereof as at 11. The shoes 10 are preferably of U-shape in cross section so as to straddle the ends of the arms 9, and are also of a length to extend substantially across the full width of the floor board 12 to be taken up. This affords a wide bearing against the under face of the board so as to minimize the danger of splitting or damaging the latter when prying the same loose. A spring 13 is associated with each shoe 10 to normally yieldingly maintain said shoe in a rearwardly tilted position for ready and proper engagement with the under side of the floor board 12 when the cross bar 6 is disposed across the floor joist 14 as shown in Figure 1.

The present tool also includes a handle member consisting of an elongated handle portion 15 and a rearwardly and upwardly curved end portion 16 terminating in a claw 17 for use in extracting nails. This handle member is in the same general form as an ordinary pinch bar and is used in exactly the same way for extracting nails and for other work when detached from the floor board engaging unit. The handle 15, 16 is adapted to be securely attached to the shank 5 by disposing the portion of this member at the juncture of the handle portion 15 and curved end portion 16 within the longitudinal groove 8 of the shank 5 as clearly shown in Figures 1 and 3, the member 15, 16 being firmly and rigidly secured to the shank 5 by means of U-bolt 18 encircling the adjacent portion of the member 15, 16 and passing through the ears 7 of shank 5, suitable wing nuts 19 being threaded upon the legs or stems of the U-bolt 18 and against the forward or front faces of the ears 7. When the two members or units of the tool are assembled as shown in Figure 1, the tool is disposed with the cross bar 6, resting upon the joist 14 and with the shoes 10 engaged with the under face of the board 12 to be taken up. A rearward and downward pull is then exerted on the upper end of the handle portion 15 so as to rock the same about the cross bar 6. By removing the nuts 19 and the U-bolt 18, the member 15, 16 may be detached from the floor-engaging unit 5, etc., so as to be used independently of the latter for extracting nails and other uses.

From the foregoing description, it is believed that the construction and manner of use, as well as the advantages of the present invention will be readily understood and appreciated by those skilled in the art. While I have illustrated and described a particular form or embodiment of the present invention, it will be apparent that modifications may be made therein such as fairly fall within the spirit and scope of the invention as claimed.

What I claim as new is:

1. A tool of the kind described, comprising a shank having a cross bar at one end, a handle member attached to said shank, curved arms extending downwardly and forwardly from the opposite end portions of said cross bar, board-engaging shoes pivoted to the forward ends of said arms, and springs normally yieldingly positioning said shoes in rearwardly tilted position for proper engagement with the under surface of a board when the cross bar is disposed across a joist.

2. An implement of the kind described, comprising a board-engaging unit having a shank provided at one end with a cross bar, arms extending downwardly and forwardly from the opposite end portions of said cross bar and having shoes at the free forward ends thereof for engagement with the under side of a board to be taken up, and a handle unit including an elongated handle portion and a rearwardly and upwardly curved portion at one end of said handle portion, said handle unit being detachably secured to said shank.

3. An implement of the kind described, comprising a board-engaging unit having a shank provided at one end with a cross bar, arms extending downwardly and forwardly from the opposite end portions of said cross bar and having shoes at the free forward ends thereof for engagement with the under side of a board to be taken up, a handle unit including an elongated handle portion and a rearwardly and upwardly curved portion at one end of said handle portion, said handle unit being detachably secured to said shank, said shank having a longitudinal groove in the rear side thereof receiving said handle unit at the juncture of its handle and curved end portions, and a U-bolt encircling said handle unit and passing through said shank to rigidly detachably secure the units together.

ELWARD P. BAKER.